United States Patent [19]

Martin et al.

[11] 3,940,150

[45] Feb. 24, 1976

[54] PARTLY MELTING ROTATING HELICAL RING ASSEMBLY

[75] Inventors: Jean Martin, Chatillon; Jean-Louis Ollier, Chilly Mazarin; Paul Petit, Bagneux, all of France

[73] Assignee: Groupement pour les Activites Atomiques et Avancees "GAAA", Le Plessis Robinson, France

[22] Filed: Sept. 26, 1974

[21] Appl. No.: 509,603

[30] Foreign Application Priority Data
Oct. 1, 1973   France ............................ 73.34998
Oct. 26, 1973  France ............................ 73.38241
Nov. 12, 1973  France ............................ 73.40130
Nov. 19, 1973  France ............................ 73.41067

[52] U.S. Cl. .................... 277/22; 277/80; 277/134; 277/135; 277/149; 277/203; 192/66
[51] Int. Cl.² ...................... F16J 15/18; F16J 15/40
[58] Field of Search ........... 277/22, 203, 53, 54, 55, 277/149, 81 P, 167, 103, 8, 80, 135, 134; 64/30 E; 192/66

[56] References Cited
UNITED STATES PATENTS
2,017,997  10/1935  Thomas ............................... 60/30 E
2,223,519  10/1940  Hornschuch ......................... 277/22
2,230,881  2/1941   Browne ................................ 277/22
2,660,367  11/1953  Ehlinger .............................. 277/53
3,004,783  10/1961  Webb .................................. 277/103
3,097,853  7/1963   McHugh ............................. 277/80
3,294,209  12/1966  Kachman et al. ................... 192/66
3,299,905  1/1967   Smirra ................................ 277/22
3,331,608  7/1967   Charrault et al. .................. 277/203

Primary Examiner—Richard E. Aegerter
Assistant Examiner—L. Footland
Attorney, Agent, or Firm—Sughrue, Rothwell, Mion, Zinn & Macpeak

[57] ABSTRACT

Partly melting rotating seal assembly surrounding a rotating shaft crossing through a wall limiting a volume of fluid kept under pressure, constituted by a solidified sleeve of the fluid to be sealed or of an intermediate fluid, contained in an external metallic sleeve fast with the wall, provided with cooling means. A very thin thread, fast with the shaft, maintains during the rotation of the shaft, a thin liquid film between the shaft and the solidified sleeve, ensuring sealing along said shaft.

19 Claims, 9 Drawing Figures

PARTLY MELTING ROTATING HELICAL RING ASSEMBLY

BACKGROUND OF THE INVENTION

The present invention concerns a partly melting rotating helical seal assembly ensuring sealing with respect to fluids along a rotating shaft. The present invention relates more particularly to a seal ensuring sealing with respect to fluids along a rotating shaft crossing through a wall separating two chambers, one of which contains the said fluid medium kept under a pressure which may reach several tens of bars whereas the second chamber may contain air under atmospheric pressure or even, may be kept under vacuum.

At present, a seal assembly ensuring sealing along a rotating shaft crossing through the wall separating a first enclosure containing a gas kept under slight pressure, from a second enclosure kept under vacuum is known. Such a seal is, in this case, in the form of a cylindrical sleeve connected to the separation wall; that sleeve has the rotating shaft crossing through it. On one of the cylindrical surfaces, opposite each other, in general on the shaft, one or several helical threads are cut in the direction which tends to expel the molecules towards the enclosure containing the gas, that is, in the reverse direction to that of the rotation of the shaft.

It is known that such a seal assembly ensures remarkable fluid-tight sealing when the gas contained in the first chamber is subjected to the molecular state and when the clearance between the sleeve and the shaft is very small.

It is obvious that such a device cannot be used without very great modifications for ensuring fluid-tight sealing of a shaft crossing through a wall separating a first chamber containing a fluid under a pressure of several bars from a chamber kept at atmospheric pressure or kept under a vacuum. Indeed, the free path of the molecules within a gas under high pressure or of a liquid is extremely small and there can no longer be any question of using the properties of the molecular state applicable to gases kept under slight pressure.

Moreover, seals designed to prevent the propagation of a fluid along a rotating shaft, tending to prevent the fluid from propagating along the shaft, are also known. These seals use the viscosity of the fluid and must operate with a very slight clearance between the shaft and the bore, in order to be able to ensure satisfactory sealing.

It will be seen that these two types of known seal assemblies have the common disadvantage of requiring a very great precision in the machining of the shaft, the bore or the fixed sleeve and the assemblies thereof.

Now, it is not possible to reduce the clearance between the fixed sleeve or the bore and the rotating shaft beyond certain limits. Indeed, even if the fixed sleeve and the shaft have been manufactured with very great precision, the least fault in the centring of the axis of rotation and the least local expansion of the shaft, the bore or the fixed sleeve would lead to an irremediable and permanent seizing of the shaft.

Moreover, these two types of seal assemblies do not ensure any sealing when the shaft is stopped, for the sealing which they provide is purely dynamic.

These considerations, which are known to the man in the art, tend to set aside the idea of applying a seal assembly of this type, even improved, to the sealing of fluids kept under high pressures.

Moreover, various inventors have contrived to solidify by freezing the fluid which it is intended to prevent from progressing along the shaft, thus forming a solid sleeve closely surrounding the shaft, formed by that fluid, frozen by a suitable auxiliary means. Sealing is then easily obtained, but that intermediate sleeve hinders, to a certain extent, the rotation of the shaft, whereas it is desirable, on the contrary, for it to have only an absolutely negligible resistance.

SUMMARY OF THE INVENTION

Combining these various techniques, the inventor has contrived to insert, in a rotating seal assembly, between the metallic sleeve and the rotating shaft, a solid intermediate sleeve whose face placed in contact with the thread cut in the shaft becomes liquid through a very slight thickness, within a monomolecular layer, for exemple, when the shaft is set in rotation subsequent to the heat given off by friction and solidifies when the shaft is motionless.

The partly melting rotating helical seal assembly which is the object of the invention and ensures sealing with respect to fluids along a rotating shaft crossing through a wall limiting a chamber containing a fluid medium kept under pressure, comprising:

a metallic sleeve fast with the said wall and surrounding the rotating shaft at a certain distance;

parallel threads having a depth of less than a half millimeter, cut in the shaft at the height of the metallic sleeve;

an intermediate sleeve arranged between the metallic sleeve and the threaded part of the shaft, entirely solid when the shaft is motionless;

means for refrigerating the intermediate sleeve;

wherein the parallel threads cut in the shaft keep the face of the said intermediate sleeve placed in contact with the shaft, in partial fusion and under balanced pressure during the rotating of the latter.

As a function of the nature of the fluid in the liquid state or in the gaseous state, contained in the chamber in which sealing is required to be ensured along the rotating shaft and as a function of the temperature of that fluid, it is, in general, easy to find a substance which is solid or at least non-deformable when the shaft is motionless but which undergoes a very slight surface melting when the shaft is in rotation, but substance being, simultaneously, compatible with respect to the fluid contained in the chamber; in this way, the device which is the object of the present invention very often makes it possible to find a very simple solution to the problem of sealing with respect to liquids or gases kept under pressure, along a shaft driven in a rotating movement, more particularly when the stopping of the shaft is not very frequent.

BRIEF DESCRIPTION OF THE DRAWINGS

The advantage afforded by such seal assemblies becomes clearly appaent on referring to examples of embodiment having no limiting character described herebelow with reference to the 8 figures.

FIG. 8' is a front cutaway view of the device of the FIG. 8 through AA'.

DESCRIPTION OF THE PREFERRED EMBODIMENTS

In all embodiments, like numerals designate like elements.

Figure 1:
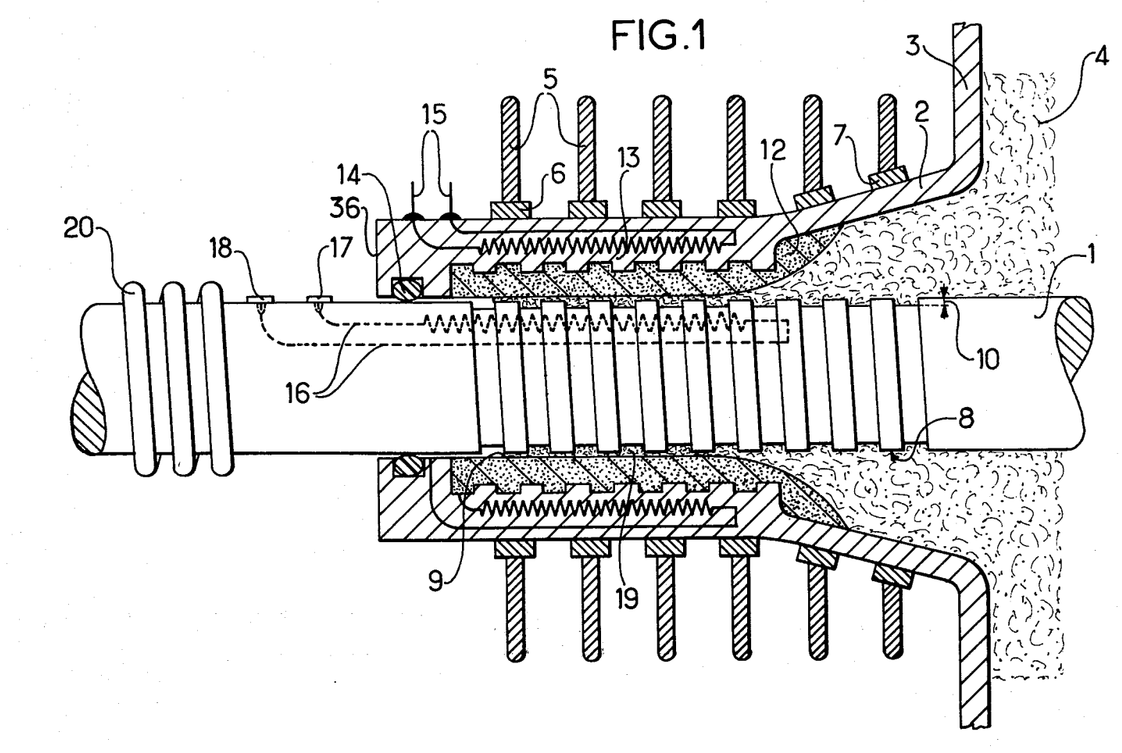
FIG. 1 is a cutaway view of the device in the particular case where the intermediate sleeve is formed by solidifying the liquid to be sealed.

FIG. 1 and the first example concern the particular case where the fluid kept under pressure is a liquid. More particularly, they concern the case where the chamber through which the rotating shaft crosses, contains liquid indium and where the sealing is ensured by an intermediate solid indium sleeve which is formed at ambient temperature between the rotating shaft and the metallic sleeve.

FIG. 1 shows, at 1, the rotating shaft. The metallic sleeve 2 connected to the wall 3 limiting the chamber containing the liquid indium 4 is arranged at 2.

The metallic sleeve 2 is provided with cooling fins 5. In the case where the mass of liquid indium is great, it is an advantage to combine therewith or use separately a system for cooling the metallic sleeve by a fluid shown in the present example by a helical tubing 6 in which a cooling fluid flows from the external part 36 of the sleeve towards the separating wall 3, rising again towards the thread 7 from which the fluid is discharged for cooling.

Opposite the metallic sleeve, the rotating shaft is provided with a multiple pitch thread 8 whose angle of inclination is, in the present case, 75° in relation to a generatrix. The cross-section of the thread is rectangular, the width of the hollow part being equal to that of the full part and the depth being in the order of a tenth of a millimeter.

The cooling means enable the discharge of the heat given off by viscous friction in the liquid placed in contact with the shaft 1 and, contingently, the heat flux coming from the fluid 4 whose sealing is to be ensured so as to keep the intermediate sleeve assembly 12 in the solid state. The distance between the shaft 1 and the metallic sleeve 2 is not absolutely critical and may reach and exceed a millimeter; however, the best performances are obtained with a clearance which does not exceed a few tenths of a millimeter. To ensure suitable fixing of the solid indium sleeve 12 to the metallic sleeve 2, in order to make heat exchanges between the two sleeves easier and to avoid all flowage to solid indium m towards the low pressure zone, a thread 13 having a pitch which is the reverse of the thread 8 is cut in the metallic sleeve 2. Moreover, it has been observed that the existence of that thread makes it possible to improve very substantially the performances of that seal.

The rotation of the shaft 1 in a solidied sleeve 12 causes, upon the immediate contact of the shaft, the forming of a very thin liquid layer 19, which is all the thinner as the external cooling is greater. That liquid layer is formed under the heat effect of friction. It enables a rotation of the shaft 1 without any appreciable torque. That thin film 19 is subjected on the one hand to the pumping effect of the thread 8 which tends to draw it towards the chamber and on the other hand to the pressure effect exerted by the indium which would have a tendency to propagate along the shaft. In the aggregate, the pumping effect ensures a zero discharge but it sets up a counter-pressure which opposes the pressure of the fluid, the viscosity forces tending to compensate the resulting force and to keep the liquid film in place. The result of this is that the liquid film 19 which is formed between the intermediate sleeve and the screw pitch does not extend up to the safety seal 14 and ends in a meniscus 9 whose position may oscillate by a few centimeters along the multiple pitch thread 8.

The direction in which the parallel threads must be cut in the shaft is evidently that with exerts on the melted film of the intermediate sleeve a reverse flow action compensating the pressure to be sealed. To define the direction in which these threads must be cut on the shaft without having to specify the direction of rotation of the shaft, it is necessary to imagine the shaft driven in a rotating movement on a nut which is supposedly fixed. The direction to be imparted to the threads is then that which would drive the shaft in an axial displacement towards the pressure to be sealed.

It is shown by calculation that the difference in pressure which the liquid film can bear is inversely proportional to the square of the thickness of that film and directly proportional to its viscosity. Circumstances therefore lead to the local cooling of indium to a fairly great extent to make that film extremely thin; the temperature of that liquid sheet is then in the vicinity of that of the melting point, so much so that simultaneously, the viscosity remains fairly high. It is thus possible, with very slight dimensions to hold a pressure reaching several tens of bars while maintaining a very slight rotational torque. Moreover, the thinness of the film imparts to it a laminar state avoiding any forming of emulsion which may occur if the liquid layer thickens; indeed, a vortex movement might then be set up and it would be liable to cause the forming of an emulsion in contact with the atmosphere.

The laminar state to which the liquid layer is subjected has made itpossible to optimize the shape, the slope of the helixes cut in the shaft and to make the results independent form the nature of the fluid with respect to which sealing is to be ensured along the rotating shaft.

It has often been considered useful to combine with this type of seal a safety seal 14 constituted by a conventional element which is as simple as possible: packing, O-ring installed for a rotation operation, lip seal, etc.

That safety seal is called upon to fulfill contingently a function during the first implementing of the seal ring.

As soon as the rotating of the shaft stops, the solidification of the liquid film occurs subsequent to the disappearance of the friction heat and perfect sealing is ensured. Only the starting up is liable to set a problem. When the seal is stopped, the liquid film being solidified, the adherence of the solid plug resists the rotating of the shaft.

It is therefore necessary to form that film of liquid again at the precise moment of the starting up by the generation of heat. That generation is easily obtained by means, for example, of a Joule effect electrical reheating circuit 15, arranged within the external metallic sleeve 2. That arrangement of the reheating circuit nevertheless causes a reheating of the intermediate sleeve 12 as a whole.

Such surfaces reheating has also been effected by making a current pass through the winding 20 surrounding the shaft 1 acting as an induction coil which causes the forming of Foucault currents at the surface of the shaft.

At the starting up, the very rapid forming of a film in the melted state on the surface of the intermediate sleeve which is placed in contact with the threaded part of the shaft may also be ensured by mechanical means, without forasmuch resorting to previous electrical reheating. It is thus possible to reduce practically to zero the idle time required for the starting up of the rotating shaft.

The device implemented then comprises, from the centre towards the outside, the following elements:
a rotating shaft crossing through the wall;
a ring fast with the rotating shaft;
a thin collar;
a metallic sleeve fast with the wall through which the rotating shaft crosses and surrounding the latter at a certain distance;
sealing between the thin collar and the metallic sleeve being ensured as previously by an intermediate sleeve which is completely solidified when the rotating shaft is stopped.

At the starting up, the heating of the intermediate sleeve is obtained because the ring ensures a friction connection between the collar and the shaft.

The result of this is that when the shaft is set in rotation, the seal collar remains motionless, for, at the starting up, it is in contact with the intermediate sleeve which is solidified throughout its mass.

The friction torque in the cold state between the seal collar and the ring fast with the shaft is adjusted in such a way that it is slightly less than the starting torque applied to the shaft. The shaft therefore starts rotating. By friction between the seal collar and the ring, the collar heats up. The thickness of the collar is sufficiently slight for the heat which is generated in its internal part to be transmitted very rapidly to the peripheral part placed in contact with the intermediate sleeve. The ring connected to the shaft has a heat conduction coefficient which is lesser than that of the collar, so that the greatest fraction of the heat given off crosses through the collar and comes into contact with the intermediate sleeve. The contact surface of the intermediate sleeve starts to melt; the friction torque between the intermediate sleeve and the collar becomes very slight; the collar starts rotating and ceases to rub against the ring; the collar, the ring and the shaft are now fast with one another. The result of this is that it is not necessary in this case to effect preheating previous to the starting of the rotation of the shaft. The wear of the contact surface of the collar and of the ring is very slight, as the melting of the surface of the intermediate sleeve may be obtained after a few turns of the rotating shaft. The friction surface between the collar and the ring does not ensure sealing at the time of the starting up. It is therefore necessary to insert an extra safety seal which will be arranged on the side of the fluid to be sealed in the case where the intermediate sleeve is constituted by a part of that fluid, kept in solid form.

That secondary seal ring will be arranged at the other end of the ring, on the downstream side, in the case where an intermediate sleeve constituted by a solid substance having a composition which is different from the fluid to be sealed is used. Indeed, when the intermediate sleeve has the same chemical composition as the fluid to be sealed, it is absolutely indispensable to prevent it from seeping in between the collar and the ring, for it would tend to solidify when the shaft is motionless and the collar would cease sliding with friction on the ring at the starting up.

Figure 2:
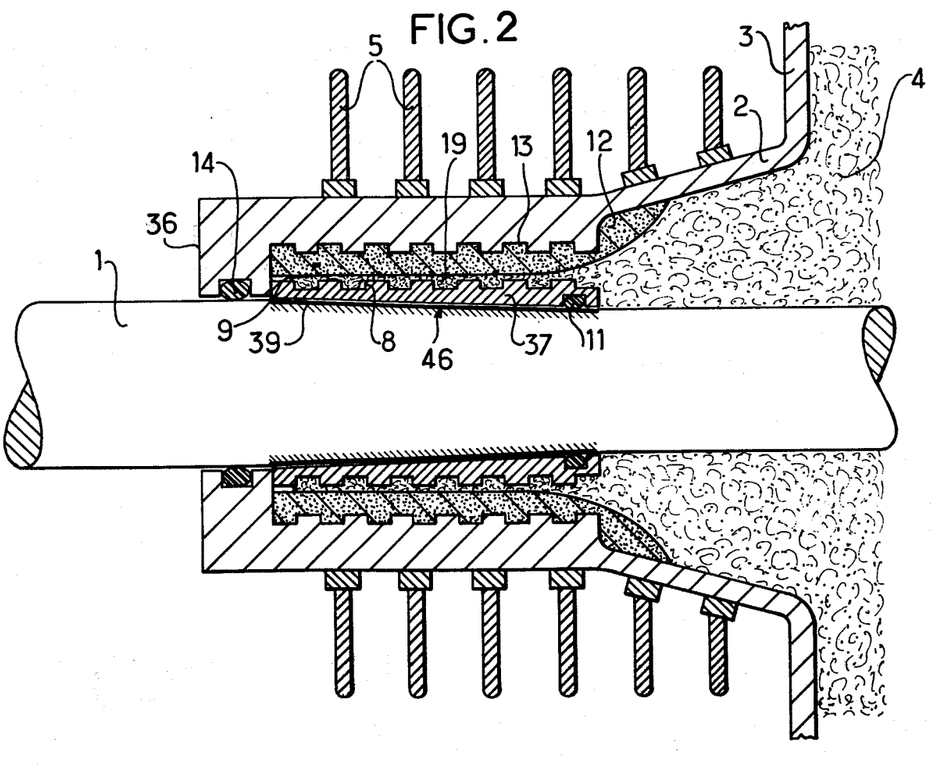
FIG. 2 is a cutaway view of the device in the case where a seal ring is assembled on a conical coating.

With reference to FIG. 2, an arrangement which is frequently used for ensuring very fast starting up of the rotating shaft shown at 1 in that figure is described. The metallic sleeve is seen at 2 connected to the wall 3 of the chamber containing the fluid 4. According to the arrangements described above, the metallic sleeve 2 is cooled. To simplify the description, in all the following text, it will be assumed that the fins 5 fulfill that function, it being understood that this cooling may be ensured simultaneously or separately by any circuit containing a suitable cooling fluid. Subsequent to that cooling of the metallic sleeve, an intermediate sleeve 12 made of the solidifed fluid 4 is formed in contact with the said metallic sleeve. By friction of the intermediate sleeve against the shaft 1, a liquid film 19 is formed. That intermediate sleeve is made fast with the metallic sleeve 2 by a thread 13. Opposite the intermediate sleeve on the shaft side, a very thin collar 37 having a conical bore is fitted onto a truncated cone shaped part 46 of the shaft 1. That collar is made of a sufficiently hard substance which is also a good heat conductor, such as certain alloys of cobalt of nickel, of chromium and of molybdenum, without iron or carbon. On that collar, the multiple pitch thread 8 has been cut. The surface of the truncated cone shaped part 46 of the shaft has been coated previously with an adhesive alumina or zirconia layer forming an annular coating 39.

A seal 11 ensures the sealing between the collar 37 and the ring 39 preventing the fluid 4 from penetrating therein at the time of the starting up when the collar 37 turns with respect to the ring 39. Indeed, if a film of that fluid were to remain between these two surfaces, that film could solidify when the shaft stopped and would be liable to block the rotating of the collar 37 with respect to the ring 39 at the time of the starting up. On the contrary, in the case where an intermediate substance is used, the flow of the fluid 4 between the ring 39 and the collar 37 causes, no hindrance; quite on the contrary, that fluid may possibly act as a lubricant and enable the ring 37 to make a few extra turns before stopping, thus contributing to the smoothing of the transition between the two relative positions of the ring 37.

At the time of starting up, the whole of the gap comprised between the metallic sleeve 2 and the threaded collar 37 is filled with fluid in the solidified state. The coefficient of friction of the collar 37 on the surface of the coating of zirconium or of alumina constituting, in the present case, the ring 39, has been chosen so that the starting torque of the element 37 on the surface 39 is less than the motor torque driving the rotating shaft at the starting up.

That value is defined experimentally by the force with which the collar 37 is fitted onto the truncated cone shaped part 46 of the shaft. Due to the presence of the seal 11, the gap between the ring 39 and the collar 37 is dry. The collar 37 starts turning with friction on the alumina or zirconia ring; the heat given off is completely absorbed by the collar 37, since the ring 39 is heat-insulant. That heat is propagated through the thin collar 37.

In the majority of cases, a certain effort must be provided for cooling the intermediate sleeve 12; for obvious economy reasons, it is kept at a temperature close to the melting point, so that when the temperature of the external surface of the collar 37 rises by only a few degrees, the surface of the intermediate sleeve 12 in contact with the collar starts to melt. At that moment, the collar 37, no longer being restrained by the sleeve 12, starts following the rotating shaft and consequently ceases rubbing against the ring 39. The rotation speed of the collar becomes equal to that of the shaft, the very slight rubbing against the liquid film of the intermediate sleeve 12 is sufficient to keep that film in the liquid state.

Figure 3:
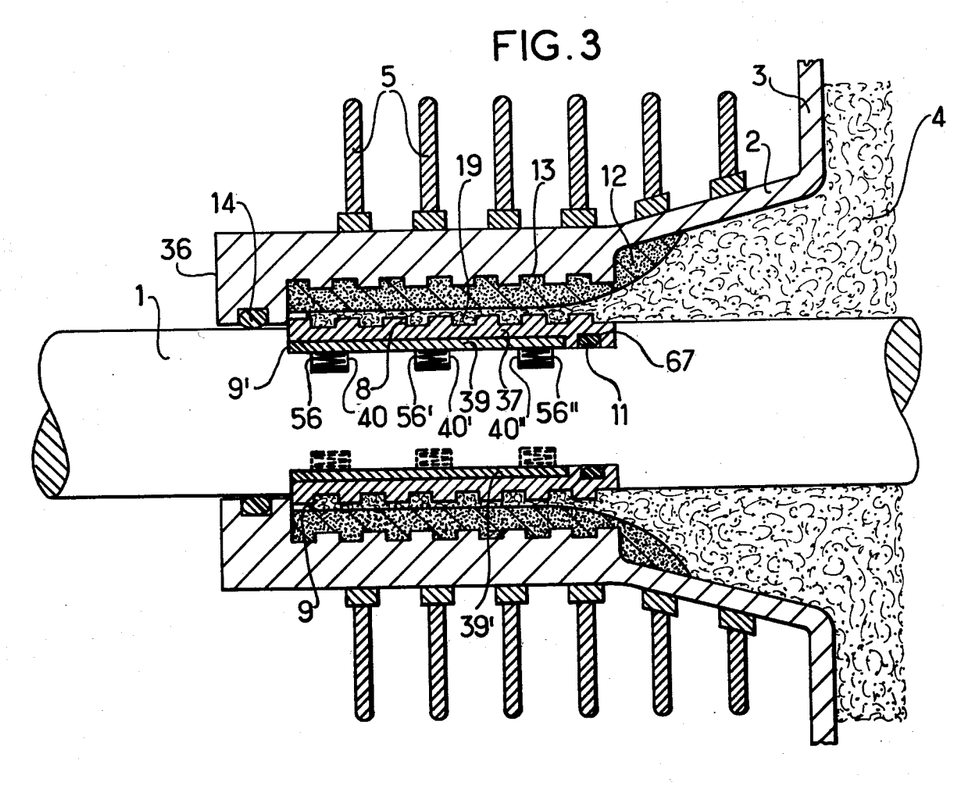
FIG. 3 is a sectional view of an embodiment corresponding to the case where a seal ring is assembled on a ring formed by segments pressed by springs.

FIG. 3 concerns, like FIG. 2, the case where the fluid 4 in the solidified state forms the intermediate sleeve 12 between the metallic sleeve 2, extended by the wall 3 and the shaft 1. The ring is constituted, in the present case, by three segments 39', these annular segments being coated with a layer basically containing asbestos 9'. In other embodiments, the ring was divided into a number of segments greater than three. Each annular segment is applied against the collar 37 by springs 56, 56' and 56''. These springs are arranged in radial cylindrical drillings 40, 40' and 40'', so that the springs being compressed, the ring formed by the 3 circular segments passes very slightly beyond the surface of the rotating shaft. It is on this ring that the collar 37 is placed. The latter, although very thin, protrudes at the surface of the rotating shaft. That collar bears, on its upstream part, a recess for an 0 ring seal 11.

The operation of the device remains similar to that described above with reference to FIG. 2. The seal ring 11 prevents the passing of the fluid 4 between the segments forming the ring, as well as along the springs 56, 56', 56'' at the time of starting up. It continues to fulfill the same functions when the collar 37 has become fast with the shaft, but then, it has only a purely static function which does not entail wear.

The device described with reference to FIG. 3 makes it possible to define with precision the pressure which the ring must ensure on the collar 37 and to keep that value constant in a large wear gap of the type known under the trademark "ferrodo".

The conical shape to be imparted to the cross-section of the shaft in the case described with reference to FIG. 2, the circular cavities and the cylindrical drillings in the shaft in the cases described with reference to FIGS. 3 and 4 in no way lessen, or at least lessen in very slight proportions, the resistance of the rotating shaft by reason of the slight thickness necessary for forming the collar 37 and for forming the ring 39.

According to the technique described above, at the time of starting up, the threaded collar fast with the intermediate sleeve remains motionless whereas the ring is driven in a rotating movement with the shaft.

The friction between the ring and the collar gives rise to a heat flux which the collar transmits to its surface of contact with the intermediate sleeve.

Very rapidly, (in a few turns of the shaft) the liquid film forming a contact between the threaded part and the intermediate sleeve is formed; the collar detaches itself from the intermediate sleeve and becomes fast with the ring and the rotating shaft. This brings the situation back to the case of the shaft in motion. It is however necessary to ensure sealing between the collar and the ring, or, between the collar and the shaft at the time of the starting up.

That operation is carried out successfully by means of a seal of the conventional rotating type 14.

Nevertheless, the inventors considered that the use of a conventional rotating seal could be completely avoided by imparting to the rotating shaft a hollow structure at the level of the seal and by transforming the device described hereinabove into a simplified clutch.

Figure 4:
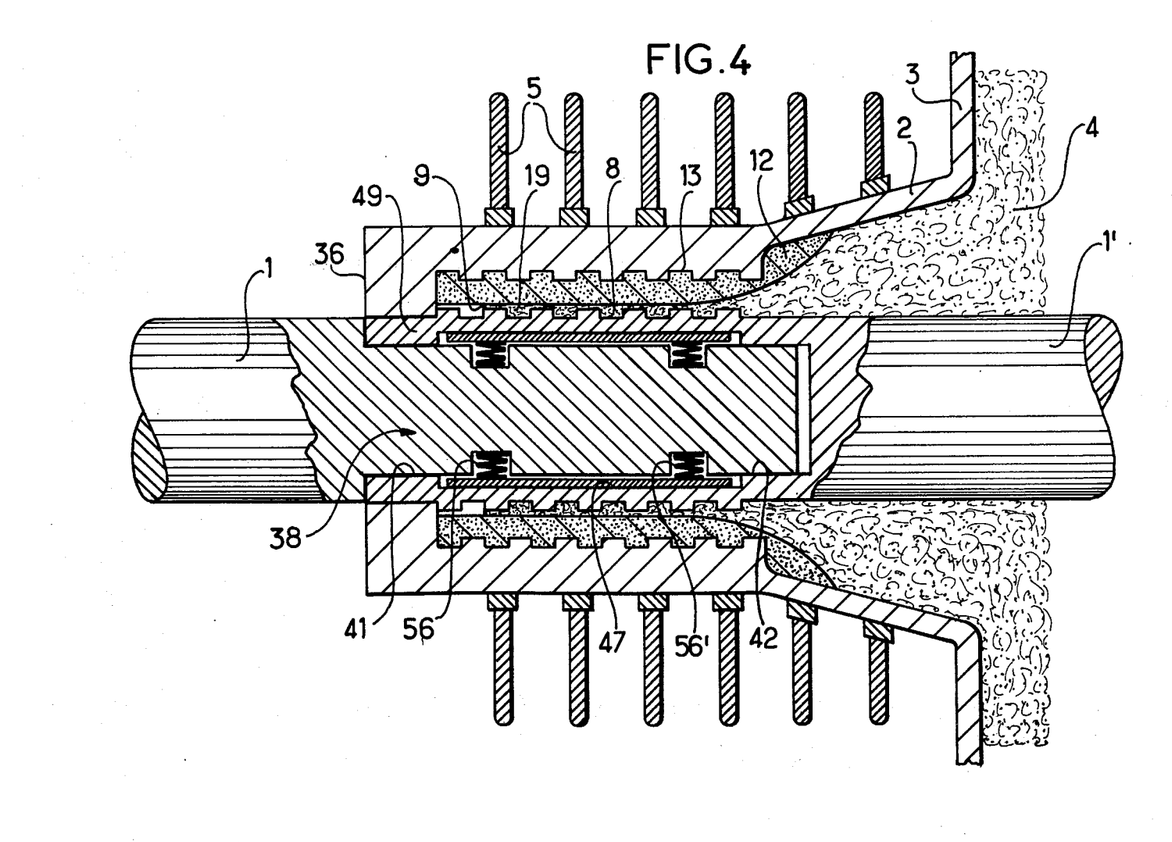
FIG. 4 is a sectional view of another embodiment where the shaft is decomposed into two elements connected together by a simplified clutch.

FIG. 4 concerns the particular case where the fluid under pressure is a liquid and where the intermediate sleeve is obtained by solidifying the liquid to be sealed at ambient temperature as is the case, for example, with indium or sulphur or sodium.

At 1, the part of the rotating shaft driven in a rotating movement by a motor, not shown, which would be arranged to the left of the figure, is shown. At 2, the sealing box having a cylindrical shape, made fast with the wall 3 of the enclosure containing the liquid 4 may be seen. The fins 5 and other means which are not shown ensure the cooling of the sealing box constituting the external metallic sleeve 2.

In the vicinity of the external metallic sleeve 2, the liquid 4 is solidified and forms the intermediate sleeve 12 which is mechanically connected to the external sleeve 2 by the thread 13.

The shaft 1 is extended inside the enclosure containing the liquid by a shaft 1' surrounding the shaft 1 at the level of the sealing box.

The mechanical connection between the drive shaft 1 and the driven shaft 1' is formed by means of a sealed clutch 38. Indeed, the shaft 1' is extended at the level of the sealing box by a collar 49 which ensures centering of the driven shaft 1' by means of two bearings 41 and 42.

That collar 49 bears a multiple pitch thread 8 having the same characteristics as previously.

The sealing between the driven shaft 1' and the wall 2 of the external metallic sleeve is ensured by the forming of a liquid film 19 at the surface of the intermediate sleeve placed in contact with the thread 8 of the collar 49 of the driven shaft 1'. That liquid film 19 ends at a certain distance from the outside of the enclosure in a meniscus 9. When the shaft 1 has been in rotation for a certain time, a non-sliding contact is established between the external wall of the collar 49 and the lining 47 of the clutch 38. that lining 47 basically containing asbestos is pressed against the collar 49 by the clutch springs 56 and 56'.

When stopped, the solid sleeve 12 completely takes up the space comprised between the collar 49 and the external metallic sleeve 2 and thus ensures perfect sealing; but it prevents the rotating of the driven shaft 1', the thread 8 of the collar 49 being completely filled by a solid substance fast with the intermediate sleeve, which is itself made fast with the external sleeve by the thread 13.

At the time of starting up, under the effect of the motor, the drive shaft 1 starts rotating.

The linings 47 of the sealed clutch pressed against the collar 49 by the springs 56 and 56', rub against the latter.

The temperature of the collar rises rapidly; the surface of the intermediate sleeve in contact with the thread 8 of the collar 49 starts melting through a slight thickness, enabling the rotating of the driven shaft 1'.

Figure 5:
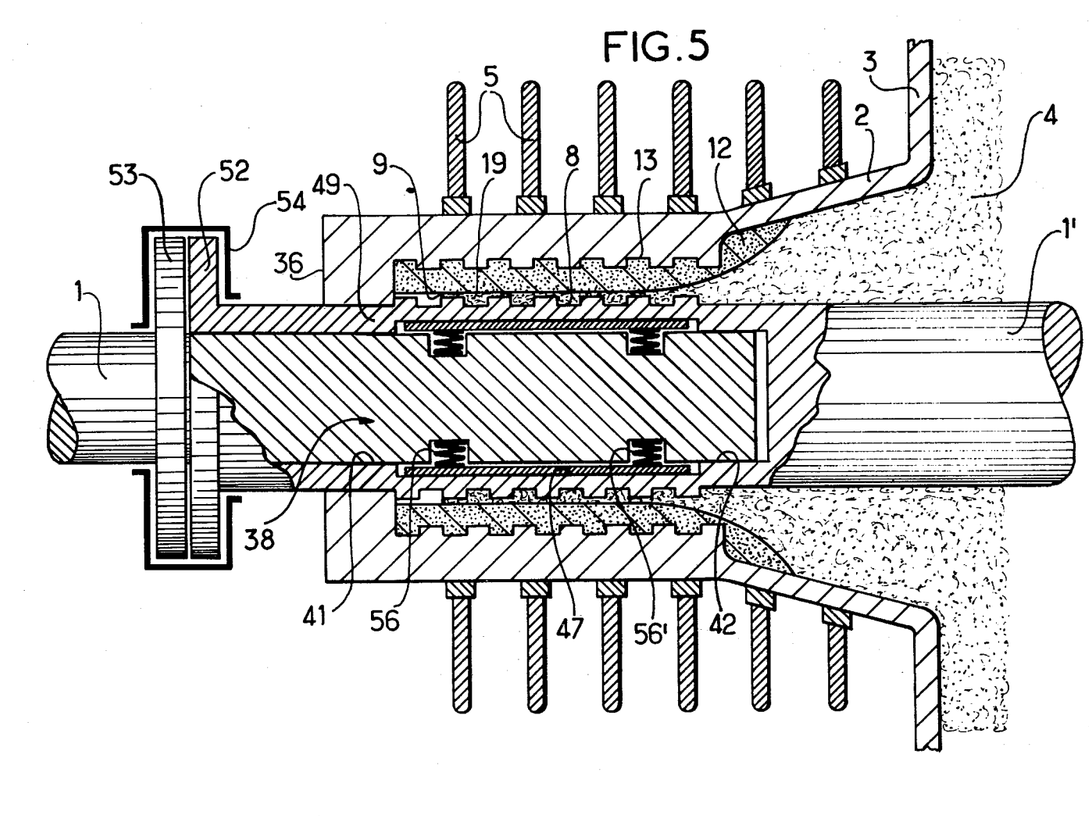
FIG. 5 is a sectional view of an embodiment employing a double clutch.

FIG. 5 concerns a double clutch device used, to gread advantage, in the case where the motor torque to be transmitted by the driven shaft 1' is a great torque.

In that case, in a device similar in all points to the previous one, the collar 49 is extended beyond the bearing 41 by a disk 52. The drive shaft 1 is also provided with a disk 53. Between the two disks 52 and 53, a clutch 54 of conventional type with adjustable sliding may establish an adjustable sliding.

At the time of starting up, the drive shaft 1 drives the driven shaft 1' through the adjustable slide clutch 54. In the clutch 38, the lining 47 pressed against the collar 49 rubs against and heats up very locally the collar 49. The surface of the intermediate sleeve in contact with the thread 8 of the collar 49 starts to melt through a slight thickness. The lining 47 ceases to slide on the collar 49.

The driven shaft 1' starts rotating at the same speed as the shaft 1. The clutch 54 ceases to slide.

Both at the time of starting up and during the normal rotation of the shaft, sealing remains ensured by the thickness of the liquid film 19 of the intermediate sleeve.

As has been seen above, one necessary condition for a thin liquid film 19 to be formed in contact with the threaded part 8 of the shaft, is effectively that this thread 8 be itself shallow, the value which appears to be optimum being situated between a tenth and two or three tenths of a millimeter in depth according to industrial products to be sealed.

This data should be considered however only as experimental data but to all intents and purposes, that depth must remain very slight, for example, less than half a millimeter.

Figure 6:
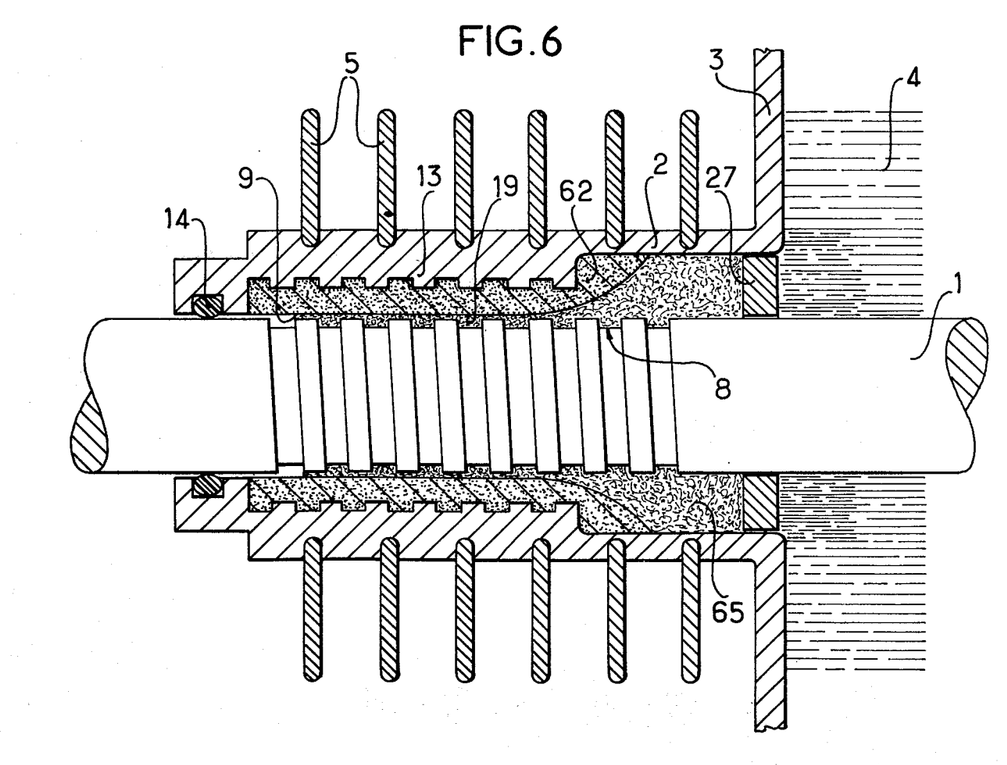
FIG. 6 is a sectional view of a general case where the intermediate sleeve is made of a substance compatible with the fluid medium to be sealed.

FIG. 6 concerns the more general case where the intermediate sleeve is made of a substance which is compatible with the fluid medium contained in the chamber and having, moreover, rheological qualities which constitute an advantage for that type of bushing.

As in FIG. 1, the shaft 1, the metallic sleeve 2 supported by the separation wall 3 of the chamber containing the fluid medium which happens to be gaseous nitrogen in the experimental case described herebelow, are illustrated again.

The metallic sleeve 2 is provided with cooling fins 5. It is not desirable to provide this metallic sleeve with cooling fluid although it is necessary to resort thereto in certain cases. The shaft is provided with threads 8 which are similar in all points to the threads cut in the rotating shaft in FIG. 1. The same applies to the metallic sleeve provided with threads 13 having a pitch which is the reverse of those of the threads 3. A solid substance having a higher melting point than the fluid 4 is found at 62. A liquid volume having the same composition as the solid 62 is found at 65. That volume is limited towards the back by the piston 27. That annular piston 27 makes it possible to transmit to the solid substance 62 through the liquid volume 65 the pressure exerted by the fluid medium contained in the chamber while ensuring a relative separation between the two mediums. Along the contact surface between the thread 8 cut in the shaft 1 and the sleeve made of intermediate substance 62, a liquid film 19 is formed, limited as in the previous case by a meniscus 9 which prevents, by the mechanism previously described, the drawing away of the intermediate substance 62 outside the chamber so that the piston 27 bears against that substance and contributes with the substance itself to the sealing of the shaft with respect to the liquid 4. The liquid volume 65 makes it possible to compensate contingent leakages of the seal during operations which last very long in inaccessible places.

The safety seal 14 is used in transit periods for the starting up of the shaft in the same conditions as previously. The intermediate substance 62 may be chosen from among the substances compatible with the fluid of the chamber; that which solidifies the easiest while retaining the property of forming rapidly a liquid film 19 at the separation of the thread 8 and of the intermediate medium 62 will preferably be taken. Therefore, a substance having not quite such a ready melting as certain simple substances and contingently having, simultaneously, a certain sliding coefficient with respect to the thread 8, will preferably be used, so that the starting up of the rotation of the shaft may be effected without using a very high torque, while ensuring a sufficient friction for the surface of that intermediate substance to heat up on the contact of the thread and very rapidly gives a thin liquid film 19.

Among the substances subjected to experiments by the inventors and having given them satisfaction, paraffins waxes, pitches, sulphur, indium as well as various conventional alloys having a relatively low melting point may be mentioned.

There is an other advantage in using a relatively soft intermediate body. The rotating shaft comprises an unavoidable excentricity. It is easier for the shaft to "find its place" within a relatively soft sleeve than in a sleeve made of a perfectly solid substance.

Such a device has given the inventors entire satisfaction during duration tests which have been organized.

It the necessity makes itself felt, it is possible, in that case, as in the preceding cases, to reinforce the cooling of the outside of the intermediate sleeve and to heat up the part of that sleeve in contact with the thread at the time of the starting up by heating by a mechanical means either by a simplified clutch or by means of a ring sliding with friction at the time of starting up.

Figure 7:
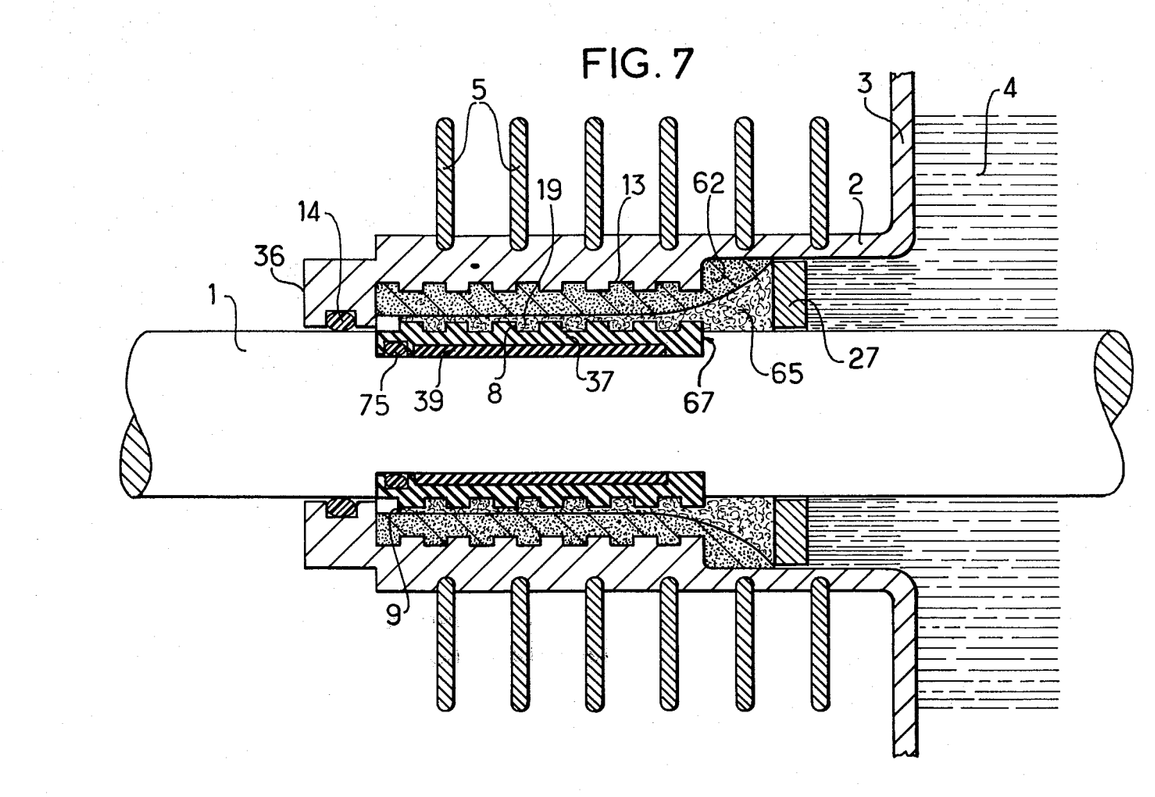
FIG. 7 is a sectional view of an embodiment where the driving of the shaft is obtained by means of an elastomeric ring.

FIG. 7 shows an arrangement which is a particular advantage in which the ring 39 corresponding to the examples described with reference to FIGS. 2 and 3 is materially shown by a hollow elastomer cylinder force fitted into a shallow circular groove 67. The fluid which is to be sealed along the shaft 1 at the bushing in a wall 3, extended outwards by a metallic sleeve 2 will be seen at 4.

In the present example, the collar 37 is fitted onto the ring 39 made of an elastomer. In this way, the surface of the ring made of an elastomer 39 is substantially flush with the surface of the shaft, the collar 37 extending, in that case, beyond the level of the shaft. The collar 37 bearing the thread 8 has undergone a surface treatment, chrome plating, for example, so as to harden its surface of contact with the ring 39 made of an elastomer. The latter has been chosen from among the elastomers which are the most resistant to heat. In certain cases, a lining basically containing asbestos has been substituted for it. When the ring is made of an elastomer, neoprene, for example, sealing between the ring 39 and the collar 37 at the time of the starting up is entirely ensured.

Only sealing between the shaft 1 and the metallic sleeve 2 must be ensured at the time of the starting up. The seal 14 continues to fulfill that function in the same conditions as previously. On the other hand, if the ring 39 has been replaced by a lining basically containing asbestos, it may be an advantage to insert an extra seal between the shaft 1 and the collar 37 such as the 0 ring 75.

The operation of the device remains similar to that described previously with reference to FIG. 2.

In all the cases examined hereinabove, it is an advantage to obtain a cooling flux by forced convection affecting the cooling fins. It consists in assembling on the rotating shaft a device for driving the ambient air and projecting that air onto the fins. In cases where the seal itself is already in a sealed environment, it will be an advantage to suck in a external fluid and to project it onto the cooling fins, continuing to use mainly, for that purpose, the drive force of the rotating shaft. Thus, a selfregulating system is obtained. Indeed, when the shaft ceases to turn the friction heat to be discharged disappears of its own accord.

Figure 8:
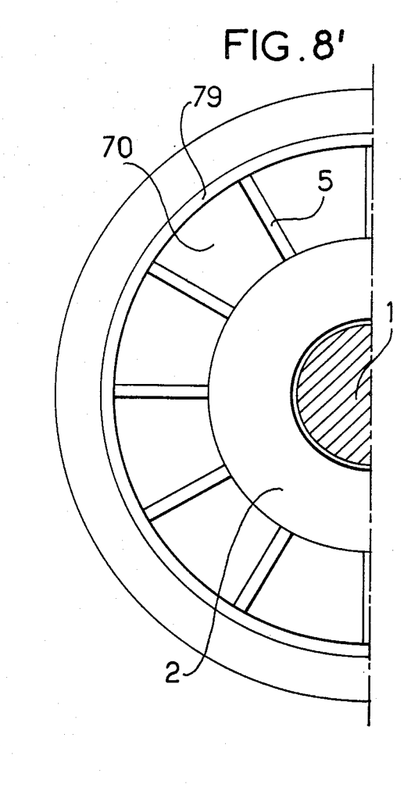
FIG. 8 is a sectional view of an embodiment incorporating a device for cooling by forced convection.

FIG. 8 shows a longitudinal cutaway view of the device in the particular case where the intermediate sleeve 12 is obtained by solidifying the liquid to be sealed.

FIG. 8' is a front cutaway view of FIG. 8 through AA'.

The device described hereinabove with reference to FIG. 8 applies, moreover, without any particular modification, to the case where the intermediate sleeve does not have the same composition as the fluid with respect to which the seal must ensure sealing.

FIG. 8 concerns the particular case where the fluid kept under pressure is a liquid. The chamber through which the rotating shaft crosses contains liquid indium. Sealing is ensured by an intermediate sleeve made of solid indium which is formed at ambient temperature between the rotating shaft and the metallic sleeve.

With the previous descriptions, it will be seen that when the shaft 1 is in rotation, the surface of the intermediate sleeve 12 is placed in contact with the rotating shaft comprises a thin layer of indium in the liquid state 19 ending towards the outside of the shaft in a meniscus 9., The intermediate sleeve is kept in the solidified state by the cooling effected by the fins 5. The fins are cooled by forced convection by an air current produced by the ventilator or fan 78 keyed to the shaft 1. The fins are connected up to an external housing 79 which is seen better in the front cutaway view 8' through AA'm so that the cool air sucked in by the ventilator 78 is projected along the fins 5 in tunnels 50 limited by the housing 79.

It will be observed that each tunnel 70 has, to great advantage, an evolutive shape with the cross-sections of the air passages increasing.

Such an evolutive cross-section facilitates, when there is a stoppage, the dissipation of the heat which may be brought in by the shaft from the heat source. The evolutive shape with an increasing cross-section of the tunnels 70 provides, therein, a chimney effect which also contributes to the cooling of the seal.

In such a device, the air projected onto the fins 5 may be sucked in the immediate vicinity of the seal or at a more favorable place. The air may be replaced by any suitable fluid without going beyond the scope of the invention.

In the cases where the fluid 4 to be sealed is very hot, it may be necessary, as in the case of FIG. 1, to combine with the forced ventilation system described hereinabove an assembly of cooling pipes in the body of the external sleeve 2 which would act in that case as an adjusting means.

What is claimed is:

1. A partly melting rotating helical seal assembly ensuring sealing with respect to fluids along a rotating shaft extending through a wall forming a chamber containing a fluid medium kept under pressure, said assembly comprising:
    an outer metallic sleeve fixed relative to said wall, surrounding the rotating shaft and spaced radially therefrom a certain distance and having threads on its inner surface facing said shaft and having a radially inwardly extending flange at the end of said threads remote from said chamber, said flange terminating radially beyond said threads and forming seal means with said shaft relative to said fluid medium;
    parallel threads having a depth of less than half a millimeter, cut in the shaft opposite the metallic sleeve;
    cooling means for said metallic sleeve;
    an intermediate sleeve arranged between the metallic sleeve and the threaded part of the shaft and being formed of a substance compatible with the fluid medium contained in the chamber, and cooled by said cooling means and frozen such that said intermediate sleeve is entirely solid and threaded to the outer sleeve and the intermediate sleeve when the shaft is motionless but capable of melting at its peripheral interface with the rotary shaft by the friction generated during rotation of the shaft; and
    wherein said threads, within said shaft form a corresponding threaded liquid interface of said intermediate sleeve during shaft rotation to prevent said pressure fluid medium from escaping from said chamber along said shaft during its rotation.

2. The partly melting rotating helical seal assembly according to claim 1, wherein the parallel threads (8) are cut in the shaft (1) to have a direction such that said threads exert on the melting film interface (19) of the intermediate sleeve (12) a reverse flow action in opposition to the pressure of the fluid medium to be sealed.

3. The partly melting rotating helical seal assembly according to claim 2, wherein a very thin layer (19) of the intermediate sleeve (12) in contact with the threaded element (8) is maintained in a molten state with the depth of the said molten thread being less than half a millimeter.

4. The partly melting rotating helical seal assembly according to claim 2, wherein the cross-section of each of the lips of the multiplex thread 8 has at least one rigid side facing the direction of the pressure of the contained fluid medium.

5. The partly melting rotating helical seal assembly according to claim 4, wherein the cross-section of each of the lips of the multiplex thread 8 has a rectangular cross-section such that the thread material area is equal to the gap area therebetween.

6. The partly melting rotating helical seal assembly according to claim 5, wherein the cross-section of each of the lips of the multiplex thread (8) has a width of less than a millimeter and wherein the inclination of the threads in relation to the generatrix of the cylinder (1) or (1') on which they are cut is in the order of 75°.

7. The partly melting rotating helical seal assembly, according to claim 1, in which the cooling means for the intermediate sleeve (12) comprises tubing (6) fixed to the outer wall of the metallic sleeve (2) and fins (5) mounted to said tubing and extending radially outwardly thereof.

8. The partly melting rotating helical seal assembly according to claim 3, wherein cooling of the fins (5) by force convection is obtained by projecting on these latter a fluid driven by a fan (78) driven by the rotating shaft (1).

9. The partly melting rotating seal assembly according to claim 8, wherein the fins (5) fast with the said external sleeve (2) are arranged in radial planes which intersect the axis of rotation of said shaft (1).

10. The partly melting rotating seal assembly according to claim 9, wherein the fins (5) fast with the said external sleeve (2) bear at their peripheral part against a metallic housing (78) forming tunnels (70) of increasing transversal cross-section.

11. The partly melting rotating helical seal assembly according to claim 1, wherein an induction coil (20) effects the reheating of the surface of contact between the intermediate sleeve (12) and the thread (8) of the rotating shaft at the time of starting up by means of Foucault currents which are formed under the effect of the magnetic field set up by said induction coil (20).

12. The partly melting rotating helical seal assembly according to claim 1, wherein:
a ring (39) is fixed to the rotating shaft;
a thin collar (37) surrounds said ring and carries said parallel threads (8); and
a friction connection is provided between the collar (37) and the shaft (1) through ring (39).

13. The partly melting rotating seal assembly according to claim 12, wherein the thin collar (37) has a conical bore which is fit onto a corresponding truncated cone shaped part (46) of the shaft (1) and said ring (39) is formed by a layer of thermally insulating metallic oxide.

14. The partly melting rotating seal assembly according to claim 12, wherein said ring (39) is elastomeric and is force fitted into a shallow circular groove (67) machined in the rotating shaft (1) at the axial position of the metallic sleeve (2).

15. The partly melting rotating helical seal assembly according to claim 1, wherein: said rotating shaft comprises a driven shaft and said assembly further comprises an element (1) having a multiple pitch thread, fixed to the driven shaft, at least when the latter is rotating, a drive shaft element situated on the outside of said chamber containing the medium kept under pressure and said driven shaft element being situated inside said chamber, and the driven shaft element (1') being extended by a collar (49) surrounding the drive shaft (1) having a multiplex thread (8).

16. The partly melting rotating helical seal assembly according to claim 15, wherein the drive shaft (1) has, a simplified clutch (36) constituted by a set of springs (56) and (56'), which press a lining (47) against the collar (49).

17. The partly melting rotating helical seal assembly according to claim 16, wherein the seal (49) is extended by a disk (52) forming a part of a second clutch 54, with said disk (52) being in friction contact with a disk (53) keyed to the drive shaft.

18. The partly melting rotating helical seal assembly according to claim 1, in which the intermediate sleeve (12) is formed by the fluid contained in the chamber, solidified at the area of contact with the metallic sleeve (2), and wherein an annular piston (27) seals the liquified substance (65) of the intermediate sleeve (12) from the fluid medium (4) contained in the chamber.

19. The partly melting rotating helical seal assembly ensuring sealing with respect to fluids along a rotating shaft according to claim 1, wherein the metallic sleeve (2) and the intermediate sleeve (12) are assembled by means of a thread (13) within the metallic sleeve (2) according to a reverse pitch to that of the thread (8).

* * * * *